United States Patent
Wickramasinghe et al.

(10) Patent No.: US 8,739,311 B2
(45) Date of Patent: May 27, 2014

(54) IMAGE FORCE MICROSCOPY OF MOLECULAR RESONANCE

(76) Inventors: H. Kumar Wickramasinghe, Irvine, CA (US); Indrajith Rajapaksa, Irvine, CA (US)

(*) Notice: Subject to any disclaimer, the term of this patent is extended or adjusted under 35 U.S.C. 154(b) by 0 days.

(21) Appl. No.: 13/816,726

(22) PCT Filed: Aug. 11, 2011

(86) PCT No.: PCT/US2011/047456
§ 371 (c)(1),
(2), (4) Date: Jul. 12, 2013

(87) PCT Pub. No.: WO2012/021727
PCT Pub. Date: Feb. 16, 2012

(65) Prior Publication Data
US 2013/0283487 A1    Oct. 24, 2013

Related U.S. Application Data

(60) Provisional application No. 61/401,495, filed on Aug. 13, 2010.

(51) Int. Cl.
*G01Q 60/38* (2010.01)
(52) U.S. Cl.
USPC ............ 850/40; 850/3; 850/23; 850/6; 850/9; 850/62

(58) Field of Classification Search
USPC ............ 850/3, 23, 6, 9, 40, 62; 250/305, 310, 250/352
See application file for complete search history.

(56) References Cited

U.S. PATENT DOCUMENTS
5,003,815 A    4/1991    Martin et al.

FOREIGN PATENT DOCUMENTS
JP    2004-221411 A    8/2004
JP    2005-008715 A    1/2005

OTHER PUBLICATIONS

Rajapaksa,I.,Uenal,K., Wickramasinghe,H.K., "Image force microscopy of molecular resonance: A microscope principle", Applied Physcis Letters, 97,073121 (2010).*

* cited by examiner

*Primary Examiner* — Jack Berman
*Assistant Examiner* — Meenakshi Sahu (57) ABSTRACT

A new method in microscopy is provided which extends the domain of AFM's to nanoscale spectroscopy. Molecular resonance of nanometer features can be detected and imaged purely by mechanical detection of the force gradient between the interaction of the optically driven molecular dipole/multipole and its mirror image in a Platinum coated scanning probe tip. The method is extendable to obtain nanoscale spectroscopic information ranging from infrared to UV and RF.

12 Claims, 13 Drawing Sheets

IMAGE FORCE MICROSCOPY OF MOLECULAR RESONANCE

CROSS-REFERENCE TO RELATED APPLICATIONS

This application claims the benefit of U.S. Provisional Patent Application No. 61/401,495 filed Aug. 13, 2010, which is hereby incorporated by reference in its entirety.

GOVERNMENT SUPPORT

This invention was made with Government support under Grant Nos. HG004431 & HG004549, awarded by the National Institutes of Health. The U.S. Government has certain rights in this invention.

FIELD OF THE INVENTION

The invention relates to microscopy. More particularly this invention relates to the use of atomic force microscopy for nanometer scale spectroscopic analysis.

BACKGROUND

AFM's have been successfully applied to nanometer scale imaging of chemical[1] magnetic[2,3] and electrostatic[4,5] properties of surfaces. These microscopes rely on probe tips (typically silicon) suitably modified to detect the specific property of interest and to translate it into a detectable force. However, except for the Magnetic Resonance Force Microscope[6] which has been used to detect nuclear magnetic resonance at mK temperatures, AFM based scanning force microscopes have been primarily used to study material properties on the nanometer scale and not for spectroscopic identification of the materials being investigated. The ability to apply AFM's for nanometer scale spectroscopic analysis will open new opportunities in materials science and biology. In biology it could be used to study molecular cell surface interactions or for next generation DNA sequencing technologies.

SUMMARY

In a first embodiment, an atomic force microscope based apparatus with a probe tip is provided comprising an energy source capable of generating a molecular dipole/multipole within an object thereby resulting in a multiple image force and force gradient on the probe tip. In another embodiment, the atomic force microscope has an energy source that emits an energy beam modulated at frequency $f_m$.

In a more particularized version of the first embodiment, the energy source is a fixed wavelength laser, tunable laser, magnetic emitter, and electromagnetic emitter.

In another more particularized version of the first embodiment, the probe tip is a mechanical resonator selected from a group consisting of cantilever and tuning fork.

In yet another version of the first embodiment, an apparatus is provided further comprising an energy focusing device that focuses the energy emitted from the energy source onto said object.

In another embodiment, an atomic force microscope based apparatus with a probe tip is provided comprising an energy source capable of generating a molecular dipole/multipole within an object thereby resulting in a multiple image force and force gradient on the probe tip, where the apparatus can provide nanometer scale spectroscopic analysis from the RF through the visible and infrared wavelengths.

In another embodiment, a method is provided for nanoscale spectroscopic detection of an object comprising generating a molecular dipole/multipole within an object, and detecting a multiple image force and a force gradient as a result thereof on the probe tip.

BRIEF DESCRIPTION OF DRAWINGS

FIG. 5: Shows a simplified image dipole representations and comparison of theory with experiment: (a) Experimental setup showing a Pt tip over a particle on a glass substrate; (b) Glass substrate can be replaced by mirror image of tip in glass substrate plus mirror image of particle in glass substrate; (c) Force gradient on the Pt tip as a function of tip—substrate spacing (with no particle on substrate); Experimental curve—dotted line; Finite element electromagnetic simulation curve—solid line; (d) Total interaction approximated from (b) by combining multiple (strong) images within the Pt tip and (weak) images in the glass substrate; (e) Approximation of situation in (d) by ignoring the weak image; (f) Finite element electromagnetic simulation of image force gradient versus tip to sample spacing for 1 nm particle on a glass substrate interacting with a Pt tip.

DETAILED DESCRIPTION

Figure 1:
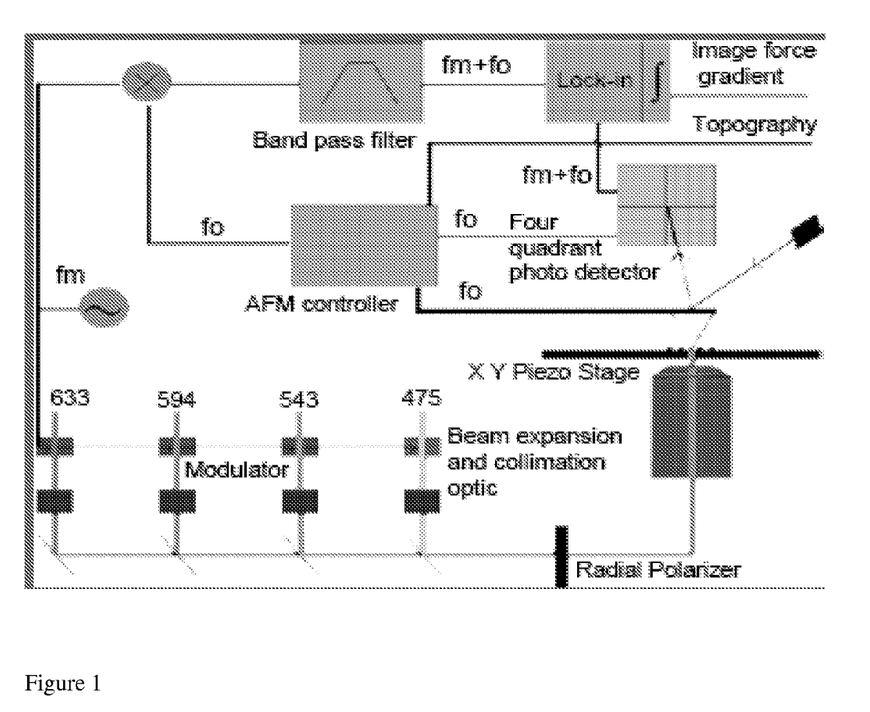
FIG. 1: Shows a schematic of the image force microscopy experiment.

Provided is a microscope built around an attractive mode AFM[7] where the cantilever is vibrated at its first mechanical resonance $f_0$ (FIG. 1) The change in the oscillation amplitude at $f_0$ is used to detect the attractive van der Waal force between the tip and object and to derive the topography feedback signal and stabilize the AFM probe over the object in a conventional tapping mode AFM. We used a cantilever with stiffness constant k=3 n/m and first mechanical resonance $f_0$=65 KHz. We chose a laser modulation frequency $f_m$=360 KHz and the frequency at the upper sideband $f_0+f_m$ was detected at 425 KHz.

Unlike more conventional methods, we also modulate the excitation/laser beam (an energy source) at a frequency $f_m$ which modulates the image force gradient between object features and their mirror images within the tip also at $f_m$. This force gradient modulation in turn modulates the cantilever mechanical resonance frequency generating sidebands at $f_0+f_m$ and $f_0-f_m$. The $f_0+f_m$ sideband which is arranged to lie on top of the second mechanical resonance of the cantilever, is detected using a lock-in amplifier while the object is raster scanned to record the two-dimensional optical image. The reference for the lock-in is derived by mixing the $f_0$ and $f_m$ drive signals in a double balanced mixer followed by a band pass filter centered at $f_0+f_m$ In our experiments, a 10 nm radius platinum coated silicon tip is illuminated by a laser beam using an oil immersion objective (NA=1.45) focused via a glass microscope cover slide. Depending on whether a laser, an electromagnetic or another energy source is used, the cantilever tip can be coated with other appropriate metals as would be known to those of skill in the art. Such metals include, but not limited to, nobel metal such as Platinum, and ferromagnetic metals such as Nickel. In another embodiment, the tip of the cantilever is not coated. The focused laser generates (or excites) an optical dipole moment within the object. As the tip approaches the object on the glass surface, this excited dipole detects/sees its mirror image within the tip resulting in an attractive force and force gradient on the probe tip. As mentioned in paragraph [0023], this force and force gradient on the probe tip is detected by measuring the cantilever response at the $f_0+f_m$ sideband which is arranged to lie on top of the second mechanical resonance of the cantilever. While the experiment was conducted with a setup that made $f_0+f_m$ sideband to lie on top of the second mechanical resonance, $f_0+f_m$ sideband can be made to lie on top of the higher mechanical resonances of the cantilever as well. To further enhance this dipole-dipole interaction, we use a radial polarizer (ARCoptix) at the entrance pupil of the objective. The optics is arranged so that we could independently couple up to four lasers ($\lambda$=633 nm, 594 nm, 543 nm, 475 nm) into the objective. The optical power at the entrance pupil of the objective was adjusted to be approximately 100 μW.

In another embodiment, where the absorbance wavelength of the sample is not known a tunable laser/excitation device could be used. In yet another embodiment, an electromagnetic or magnetic excitation device could be used to excite the object. In a more general embodiment, an energy source capable of exciting an object could be used.

Figure 2:
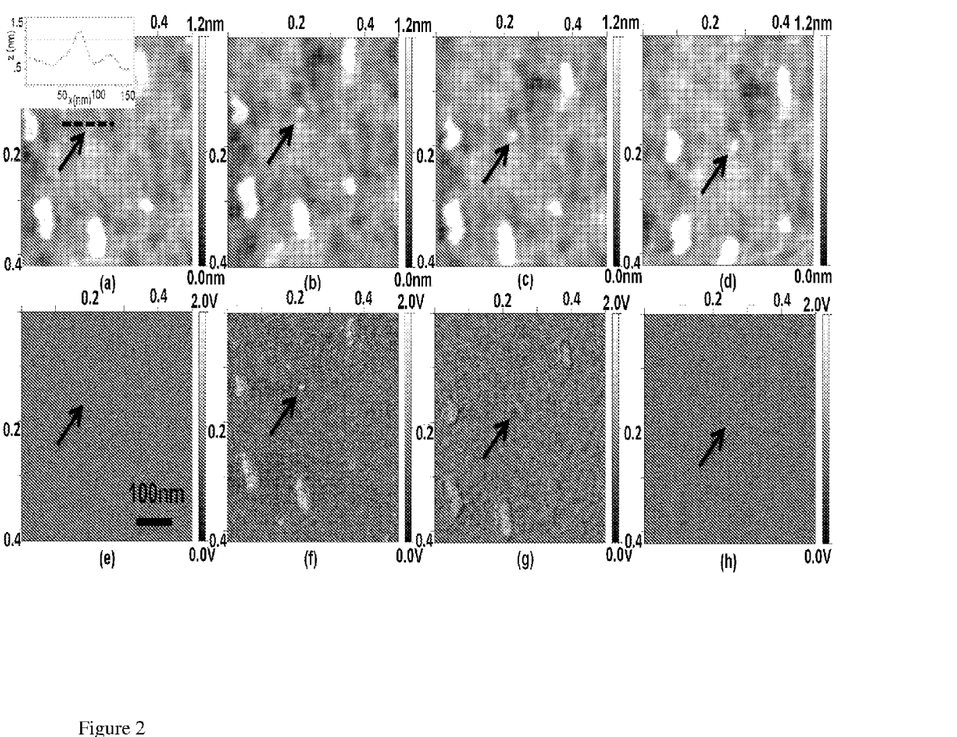
FIG. 2: Shows 6-Tamra dye molecule images on glass—maximum absorption near 543 nm (a) (e) Topography and Image force gradient with the laser line 475 nm; inset in (a) shows the topography line scan across the dashed line; (b) (f) Topography and Image force gradient with the laser line 543 nm; (c) (g) Topography and Image force gradient with the laser line 594 nm; (d) (h) Topography and Image force gradient with the laser line 633 nm.

The first experiment was performed using 6-tamra dye. We pipetted a 100 μL drop of $4\times10^{-7}$ mM 6-tamra dye dissolved in water onto a clean glass microscope cover slide and allowed it to dry. The dye aggregated into tiny islands with an average dimension of approximately 50 nm while the smallest features (designated by arrows in FIG. 2) were on the order of 10 nm We simultaneously recorded the topography (FIG. 2 top row) and the optical image force gradient (FIG. 2 bottom row) at a series of wavelengths around the optical resonance peak at 543 nm. As expected, aside form a slight thermal drift in the images, the topography signal shows no contrast variation with wavelength. The image force signal on the other hand shows a clear contrast variation as we scan through the optical resonance at 543 nm where the maximum contrast is observed. Virtually no contrast is visible in the optical image force micrographs at 475 nm and 633 nm. The optical image force micrographs were normalized so that the background signal was the same at all recorded wavelengths. The smallest optical image force feature recorded showing spectroscopic contrast was 10 nm in lateral dimensions and had a feature height of 0.5 nm, comparable to the height of a 6-tamra molecule. Since the tip diameter is also approximately 10 nm, we infer that the smallest object feature must have a lateral dimension significantly smaller than 10 nm.

Figure 3:
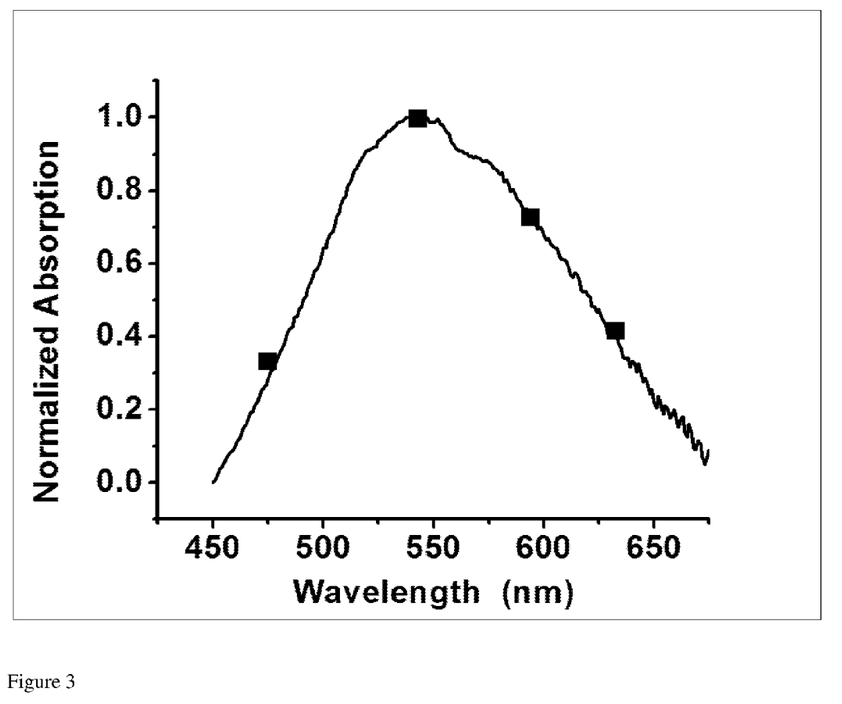
FIG. 3: Shows an AFM Image force gradient signal and Perkin Elmer 6-Tamra dye absorption spectrum.

To further validate our imaging concept, we spread a thick layer of 6-tamra dye onto a glass microscope cover slide and recorded an absorption spectrum of the film using a Perkin-Elmer Lambda 40 spectrophotometer. FIG. 3 shows the optical image force gradient signal recorded on an island of 6-tamra as a function of wavelength superimposed on the recorded Perkin-Elmer spectrum (solid line); the agreement is excellent.

Figure 4:
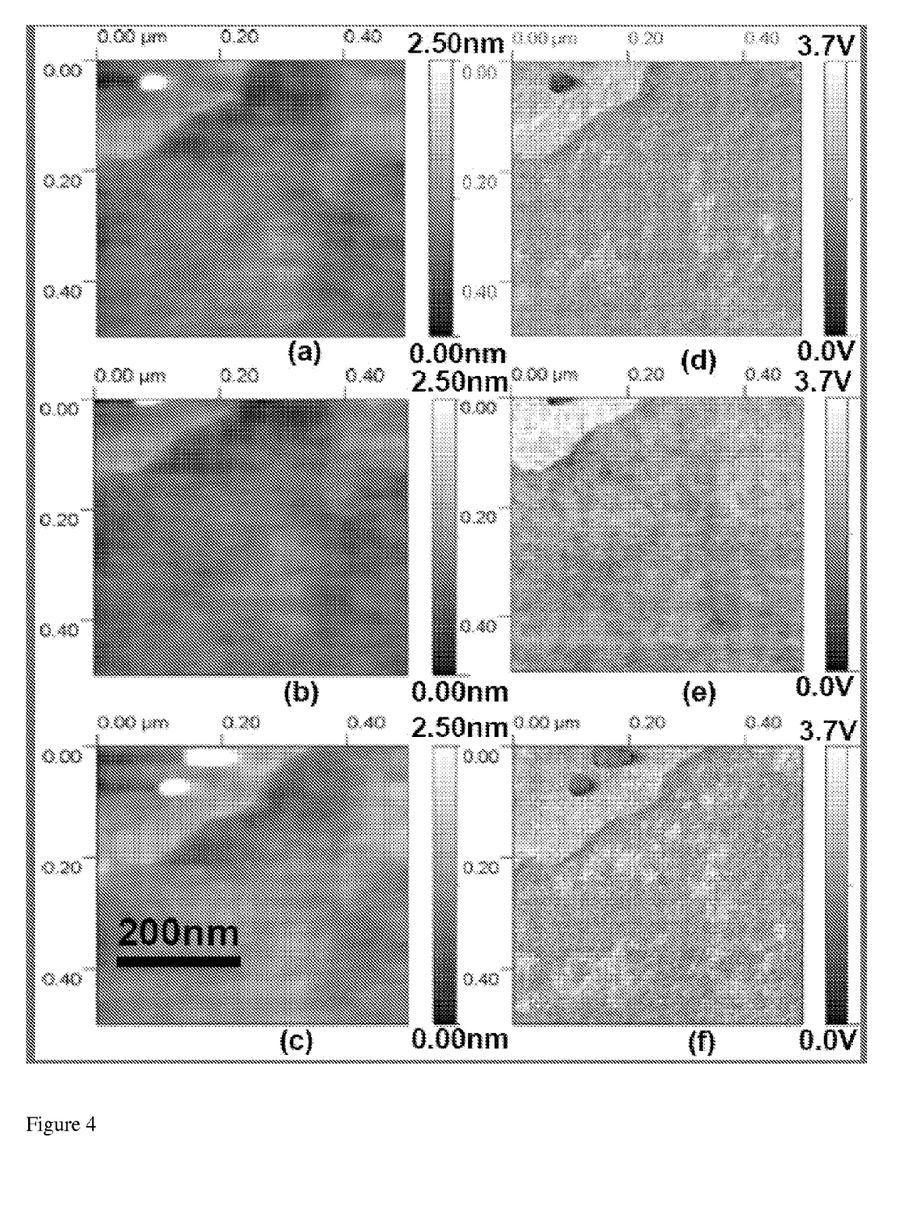
FIG. 4: Shows YOYO-3 dye molecule images on glass maximum absorption near 594 nm; (a) (d) Topography and Image force gradient with the laser line 543 nm; b) (e) Topography and Image force gradient with the laser line 594 nm; (c) (f) Topography and Image force gradient with the laser line 633 nm.

In a second series of experiments, we performed similar experiments to the 6-tamra experiments but using YOYO 3 dye (peak absorption near $\lambda$=594 nm). In this series of experiments, we were fortunate to trap a piece of dust within a YOYO 3 island. FIG. 4 (first column) shows a series of topography images recorded at 543 nm, 594 nm and 633 nm where the piece of dust in the center of the island is clearly visible. FIG. 4 (second column) shows the simultaneously recorded optical image force gradient micrographs. The highest spectroscopic contrast is observed at $\lambda$=594 nm and as expected the dust particle shows no spectroscopic contrast.

There are four possible candidates for the observed optical contrast. The first two candidates derive from photo displacement microscopy[8]. In the first case, the tip enhanced optical field can lead to a highly localized light absorption within the molecules beneath the tip at their resonance frequency resulting in a temperature increase and a corresponding periodic dilation of the glass substrate at the chopping frequency $f_m$. However, if this were the case, one would expect a dilation amplitude $\Delta L$ given by[9] $\Delta L = P_{abs}\alpha/\kappa$ where $P_{abs}$ is local absorbed power beneath the tip, $\alpha$ is the thermal expansion coefficient and $\kappa$ is the thermal conductivity of the glass substrate. If we assume a single molecule under the tip with an absorption cross section $\sigma=10^{-16}$ cm$^2$ we get $\Delta L=6\times10^{-18}$ m—too small to be detected using our setup. In the second case, the optical field can result in light absorption within the tip causing it to periodically dilate. We have both calculated and simulated this situation for our experiment and find that the resulting periodic dilation amplitude is less than $2.1\times10^{-6}$ nm—far too small to be detected by our system (see supplementary material). The third candidate possibility results from the direct dilation of a molecule caused by the absorbed optical power. If we assume a rather high temperature increase of 10 K due to the molecular absorbed power and $\alpha=10^{-6}$/K we estimate the dilation of a molecule to be on the order of $2\times10^{-6}$ nm—again too small to be detected in our setup. The fourth contrast mechanism is the one proposed in this article—namely the image force gradient between the object and its image dipole in the scanning probe tip.

Figure 5:
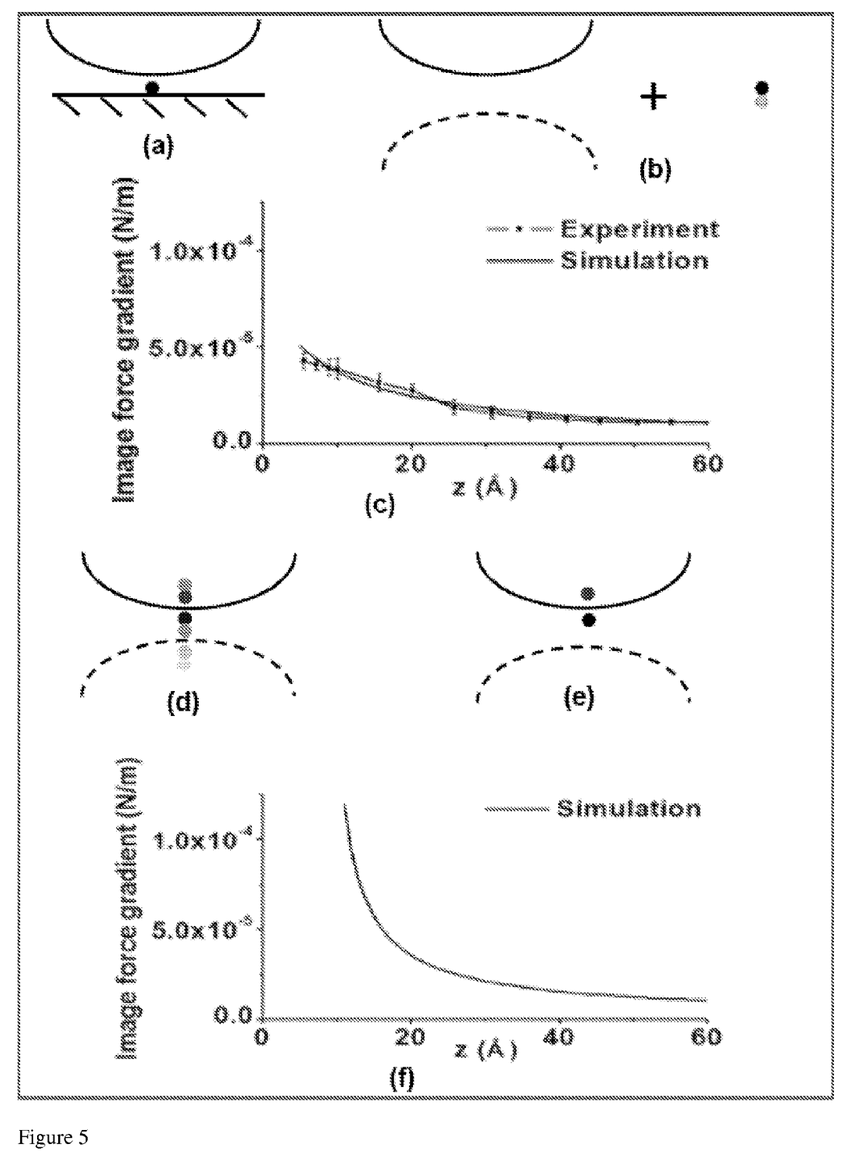

To get an estimate of the image force gradients involved, we performed a finite element (COMSOL) analysis of the tip sample interaction. The salient features of the physics can be understood by referring to FIG. 5(a) showing a tip interacting with a particle on a substrate. We can include the effect of the glass substrate by replacing it with the mirror image of the tip in the glass plus the mirror image of the particle in the glass—FIG. 5(b); the complex reflectivity R of the glass minor being given by the Fresnel equations R=(1−n)/(1+n), n being the complex refractive index of glass. We then approximate the situation in FIG. 5(b) with FIG. 5(d) where the particle/image pair in FIG. 5(b) makes multiple reflections in the tip and in the (weak) tip minor image. If we neglect the weak reflections, we can approximate the situation in FIG. 5(d) to first order with FIG. 5(e) where the particle is essentially interacting with its minor image in the tip. FIG. 5(c)—dotted line—shows the optical image force gradient versus tip-substrate spacing calculated using a full electromagnetic simulation of the situation in FIG. 5(a) (without the particle) compared with experimental approach curves obtained with the control loop momentarily opened; the detected signal was normalized with respect to the measured tip vibration amplitude. The vibration amplitude of the cantilever with the tip retracted far from the sample surface was 40 nm. FIG. 5(f) shows the calculated force gradient versus tip—particle spacing for the case of FIG. 5(a) with the particle in place. As expected, we see a rapid decay of the signal (over a distance of a nm) due to the highly localized image force dipole coupling. We also experimentally observe this rapid decay; the image contrast completely disappears when the tip is retracted just 1 nm from the surface (much like in a tunneling microscope) although so far it has been a challenge to record this decay curve due to the thermal drift in the scanning system. A full electromagnetic field calculation and a simplified dipole theory calculation for case of FIG. 5(e) is provided in the supplementary material (see below).

We can estimate the image force and force gradient from the measured data. The S/N ratio at the second resonance of 425 KHz was 30 dB in a bandwidth of 10 Hz. The Q at the second resonance $Q_1$ was 115 and Q at the fundamental $Q_2$ was 115. From this we calculate that the detected force was $2.7 \times 10^{-12}$ N and the force gradient was $2.1 \times 10^{-5}$ N/m (see supplemental material). The detectable force can be reduced down to $10^{-18}$ N range by operating in vacuum and increasing Q to 10,000, by going to lower temperatures, by increasing cantilever resonance frequencies or by using lower stiffness cantilevers[6,7].

In conclusion, we introduced a new technique of scanning microscopy based on detecting the image force gradient between an object and its mirror image in a scanning probe tip. While apertureless near-field microscopes[10,11] based on light scattering from tips have had great success in imaging nanoscopic objects from the visible to the infrared, the signals are very weak because they are based on far-field detection of a near-field interaction. However, our method can be extended from the RF through the visible and infrared wavelengths by using an energy source of an appropriate frequency, and we see no impediment to achieving atomic resolution at visible wavelengths with this technique. Furthermore, electronic and magnetic oscillations could also be imaged using the same technique. Accordingly, the method disclosed may be capable of imaging nanoscopic objects from 100 m through $10^{-2}$ nm.

Although a cantilever is used in these examples, tuning forks or other mechanical resonators known to those skilled in the art could be used instead. Moreover, although optical lenses were used in the above examples to focus the laser beams onto the object/specimen, in embodiments where other energy fields are used, a person of skill in the art would appreciate that other focusing devices could be used, such as electrical beam focusing devices. Additionally, although the energy source (laser beam) was shown to be directed to the tip and sample area from the bottom of the sample (FIG. 1), the energy source can be directed to the tip and sample area from the top or from the side of the tip and sample area. For top side illumination, a cantilever with a protruding tip such as Advan-ceTEC line of cantilevers from Nanosensors (http://www.nanosensors.com) can be used.

It should also be noted that although the examples mention 'dipoles', the method and apparatus are also applicable for nanometer scale spectroscopy on 'multipole' molecules.

Supplemental Materials

I. Electromagnetic Field and Image Force Simulation

We conducted extensive 3D simulations by solving Maxwell equations with the finite element package COMSOL. The incident wave (wavelength 543 nm) was modeled as a plane wave with an electric field along the tip axis and an amplitude equal to that of the focused 100 µW laser spot.

Symmetry in the X coordinate was exploited to simplify the problem domain and increase memory efficiency. We modeled the Pt tip and glass substrate using published experimental material parameters[1]. The tip was modeled as an ellipsoid, height 0.29 µm and radius of curvature equal to that of the tips used in our experiment. The simulation domain was 0.5×1.0×1.8 µm. The infinite domain was simulated using 0.5 micrometers thick perfectly matched layers (PML). Care was taken to match the glass and air interfaces with the adjacent PML layers.

We considered two cases, the tip over the substrate and the tip over the particle on the substrate. The particle was a sphere of 1 nm diameter containing 6 Tamra molecules. The absorption response of 6 Tamra was represented by an ideal Lorentzian oscillator at resonance[2]. From the Lorentzian model we extracted the complex dielectric constant 1.7-7.1i for the particle containing 6 Tamra molecules.

Figure 6:
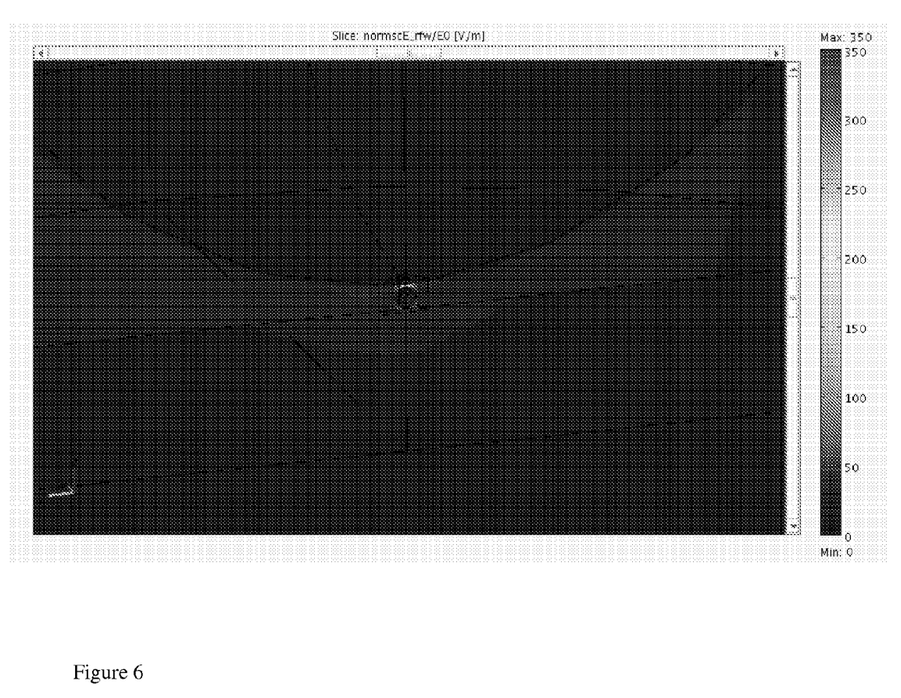
FIG. 6 shows the ratio of Electric field (E)/Incident electric field (E0) distribution near the tip with the particle on top of the substrate.
Figure 7:
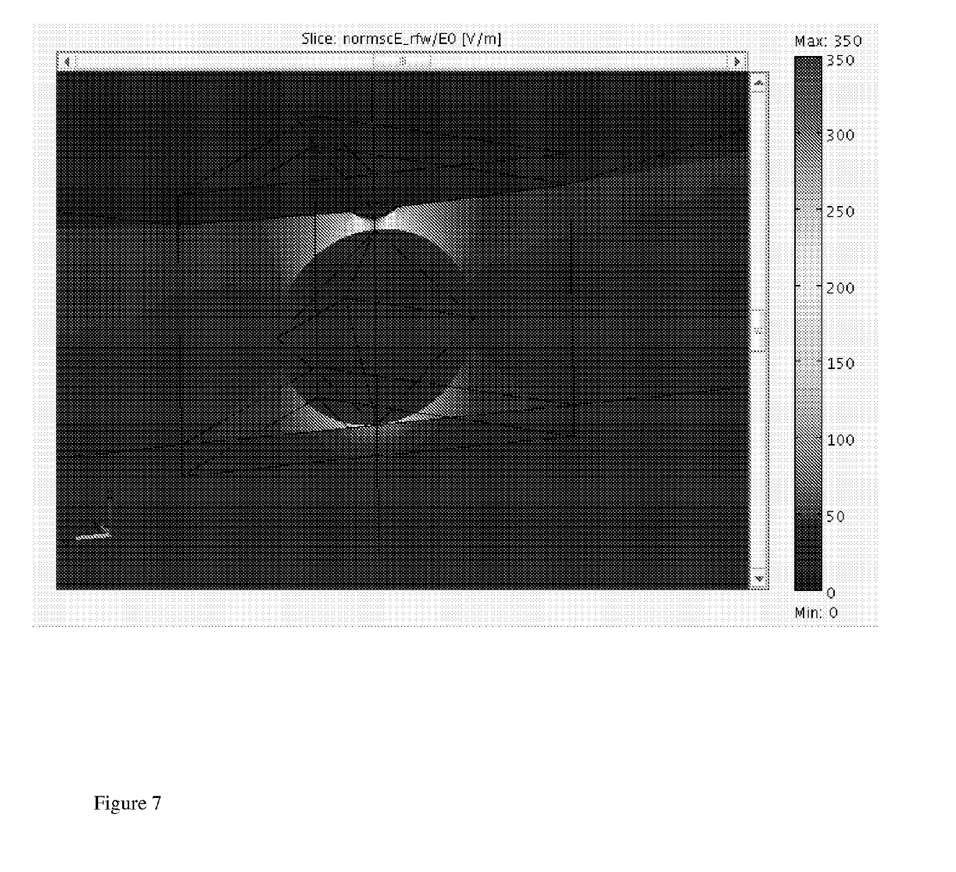
FIG. 7 shows the expanded E/E0 distribution close to the particle.

The electric field distribution in the vicinity of the particle is shown in FIGS. 6 and 7.

The z direction of the image force on the tip was calculated by performing a boundary integration of the Maxwell Stress Tensor over the tip surface[3].

$$F_z = \oint \sigma_{z,j} n_j ds$$

Where the Maxwell Stress Tensor is given by $$\sigma_{i,j} = \epsilon_0 E_i E_j + \frac{1}{\mu_\sigma} H_i H_j - \frac{1}{2}\delta_{i,j}(\vec{E}.\vec{E} + \vec{H}.\vec{H})$$

Finally, the force gradient was calculated by numerical differentiation of the Force vs Distance curve.

II. Analysis and Estimation of Tip Heating Effects

Figure 8:
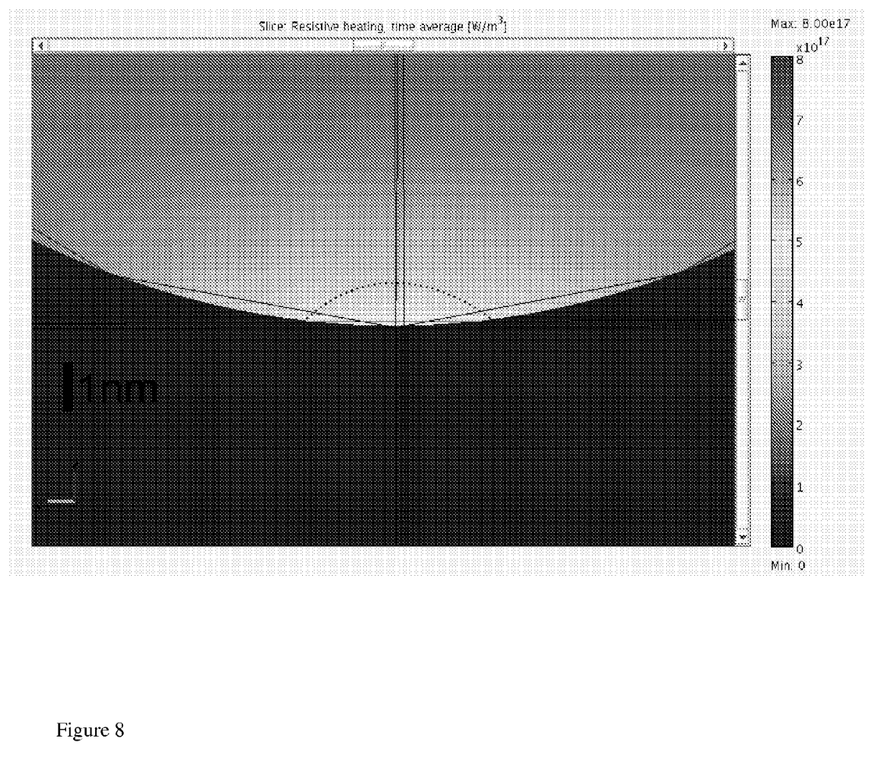
FIG. 8 shows the simulated resistive heating distribution in the Pt Tip touching the glass surface.
Figure 9:
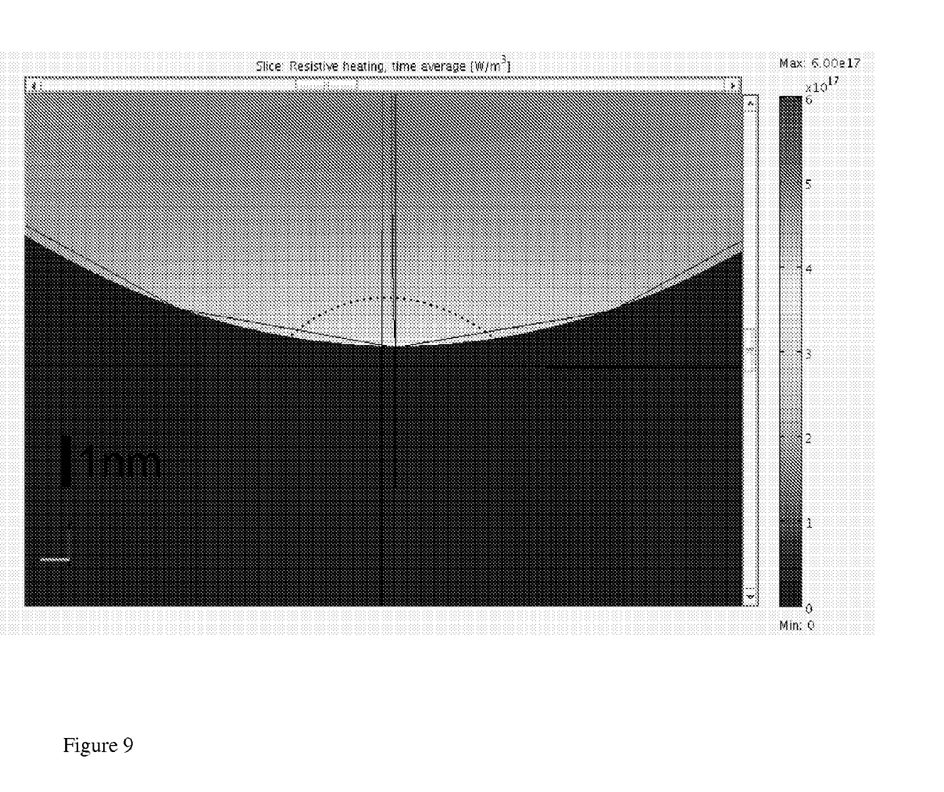
FIG. 9 shows the simulated resistive heating distribution in the Pt Tip 0.5 nm retracted from the glass surface.

We use the COMSOL built in functions to calculate the time averaged (at optical frequency) deposition of power due to the electromagnetic absorption within the tip. Once again, we used parameters that matched our experiments. The tip consisted of a silicon core of radius 10 nm over coated with a 10 nm film of platinum. We first computed the electromagnetic field distribution as described in the previous section and then calculated the deposited power density within the tip. FIGS. 8 and 9 show the color coded power density distribution within the tip. We note that the deposited power is highly localized to a hemispherical region of approximately 2 nm in radius at the very end of the tip. The average power density is $1.0 \times 10^{18}$ W/m³ for the case where the tip is in contact with the glass sample (FIG. 8) and $0.5 \times 10^{18}$ W/m³ when the tip is retracted 0.5 nm from the glass surface (FIG. 9). We have validated our COMSOL simulations against the published work of Downes et. al[4] by repeating their simulations for the special case of a Gold tip on a Gold surface.

Figure 10:
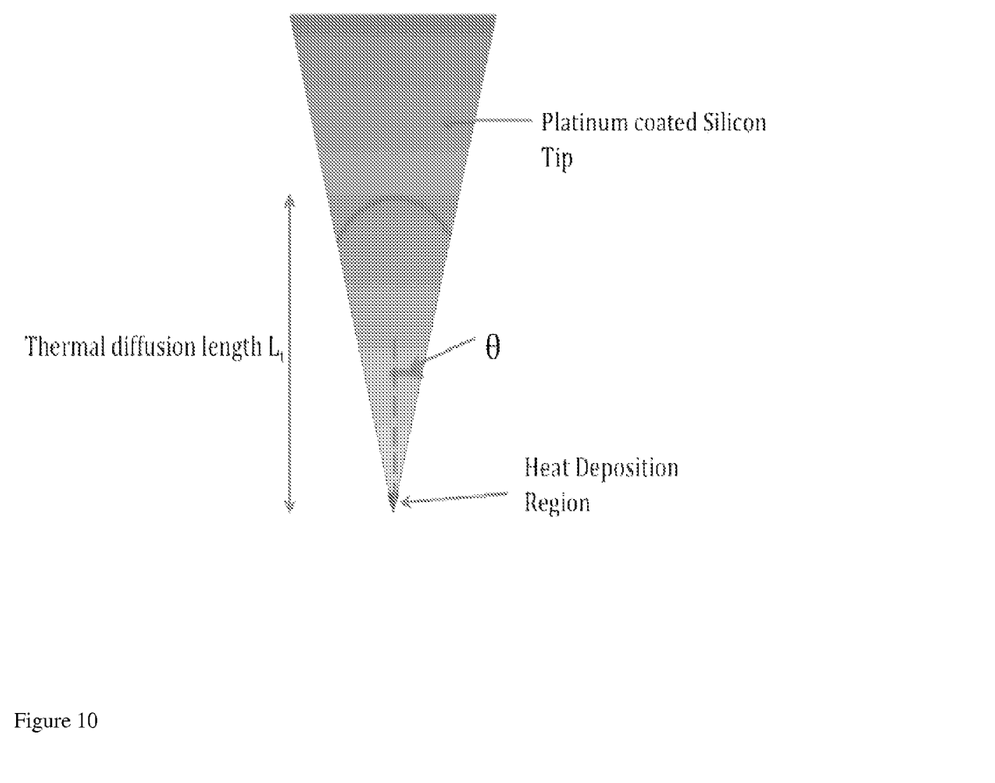
FIG. 10 shows tip geometry used in calculating photothermal displacement.

The deposited power is chopped at $f_m$ (typically 360 KHz in our experiments) in order to derive the Image Force Microscopy signal. This modulation results in a DC expansion plus an AC expansion of the tip at the chopping frequency. Since our contrast is derived from an AC signal, the constant DC expansion is of no consequence and will not be considered further. We follow the formulation given by Black et. al.[5] in the context of photothermal displacement spectroscopy to derive an expression for the AC component of the photothermal displacement. FIG. 10 shows the tip geometry used in our derivation.

In this model, the heat is deposited at the very end of the tip and its modulation sets up a thermal wave that decays to 1/e of its initial value at a distance defined by the thermal diffusion length $L_t$ given by $$L_t = \sqrt{(\kappa/\rho C)(1/\pi f_m)}$$

where $\kappa$ is the thermal conductivity of the tip, $\rho$ is the density, C is the specific heat and $f_m$ is the optical chopping frequency. For the material properties used for our tips, $L_t$ is much larger than the size of the heat deposition region and therefore we are in the low frequency limit as defined in reference 5.

The temperature increase $\Delta T$ over a single cycle of modulation is given by $$\Delta T = (P/2f_m)/(\rho V C)$$

where P is the peak-peak modulation of absorbed power and V is the volume of the material being heated. In our case, the volume heated is a conical shaped region bounded by the tip end at the bottom and the thermal diffusion length at the top. The cone half angle is $\theta$. V is given by $$V = (1-\cos\theta) 2\pi L_t^3/3$$

and the peak-peak temperature modulation is $$\Delta T = \tfrac{3}{4} P/[\pi f_m \rho C(1-\cos\theta)L_t^3]$$

This temperature modulation gives rise to a peak-peak tip expansion $\delta L$ given by $$\delta L = L_t \alpha \Delta T$$

where $\alpha$ is the thermal expansion coefficient of the tip. Substituting for $\Delta T$ yields the peak-peak expansion $$\delta L = \tfrac{3}{4} P\alpha/[\kappa(1-\cos\theta)]$$

We use the thermal parameters of Silicon rather than that of Platinum to estimate $\delta L$ since the thermal diffusion length in Silicon is almost double that in Platinum. The absorbed power P deposited over the 1 nm radius hemisphere is $10^{-9} \times 2\pi/3$ W. If we take the thermal parameters for Silicon, $\kappa=148$ W/mK, $\alpha=4.7\times10^{-6}$ and a tip cone half angle of 10°, we get the peak-peak expansion $\delta L=2.1\times10^{-6}$ nm which is 100 times below the thermal noise of our cantilever.

Figure 11:
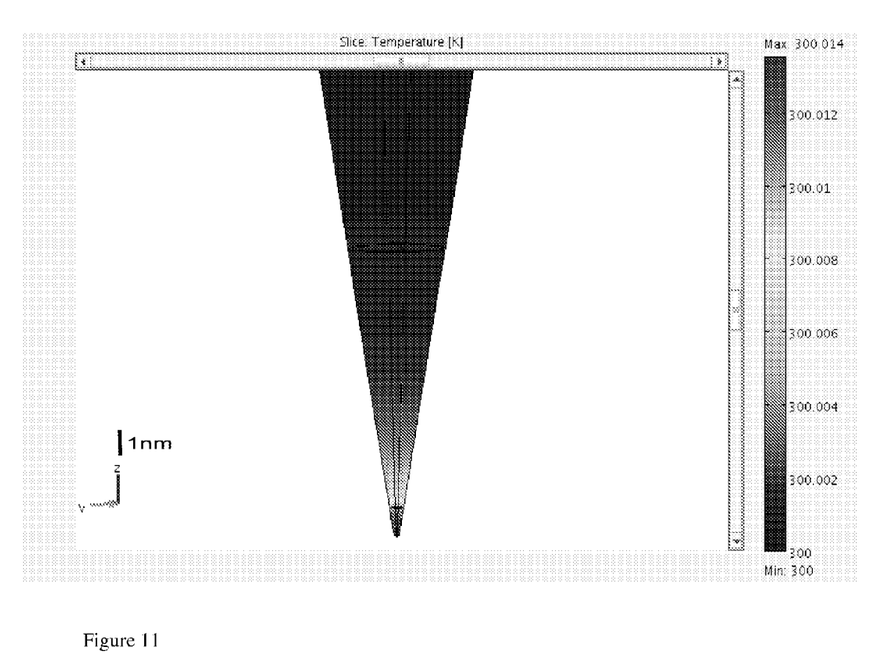
FIG. 11 shows simulated transient temperature distribution in tip.

We have also simulated the temperature increase and expansion of the tip by inputting the absorbed power from our finite element electromagnetic simulations into the COMSOL energy transport model for transient thermal analysis. The temperature distribution is shown in FIG. 11. The calculated tip thermal expansion found by integrating the temperature increase over the 15 μm length of the tip is $4.1\times10^{-7}$ nm-5× smaller than the closed form expression value derived above.

III. Estimate of the Detected Force and Force Gradient

In this section we estimate the detected force and force gradient. The measured signal/noise at the second cantilever resonance of 425 KHz in a typical experiment is 30 dB in a bandwidth of 10 Hz. The thermal noise amplitude N of the cantilever at the second resonance is given by[6]

$$N^2 = 4KTBQ_2/\omega k_2$$

where $k_2$ is the cantilever stiffness at the second resonance, K is Boltzmann constant, B is the system bandwidth, $Q_2$ is the Q of the cantilever second resonance, T is the absolute temperature and $\omega$ is the resonance frequency. For T=300K, B=10 Hz, $Q_2$=115, $k_2$=128 N/m and $\omega=2\pi\times425$ KHz, we get N=$2.4\times10^{-4}$ nm. The measured deflection X corresponding to the optical image force is 20 dB above this value or $2.4\times10^{-3}$ nm and the corresponding force $F=k_2 X/Q_2$ or $2.7\times10^{-12}$ N. The smallest detectable optical force based on the cantilever noise N is $2.7\times10^{-13}$ N.

We can reduce N and therefore significantly decrease the minimum detectable optical image force by going to lower temperatures, working in vacuum for higher Q's, using lower stiffness cantilevers or by going to higher cantilever frequencies.

We estimate the detected image force gradient as follows. The chopped optical beam at 360 KHz modulates the image force gradient between tip and sample which in turn modulates the cantilever oscillation amplitude at its first resonance or "carrier frequency" (65 KHz). This modulation results in "sidebands" about the carrier at 425 KHz and 295 KHz. If the modulation index is m, then the sideband to carrier ratio is m/2.

The measured sideband to carrier ratio in our experiments was −80 db (after the Q enhancement at the second resonance has been factored out) so that $m/2=10^{-4}$ and $m=2\times10^{-4}$. The change $\Delta A$ in the cantilever oscillation amplitude A at its first resonance frequency caused by the optical image force gradient modulation F' acting on the cantilever is given by[6]

$$\Delta A/A = Q_1 F'/2k_1$$

where $k_1$ is the cantilever stiffness and $Q_1$ is the Q factor at the first resonance frequency. Since $\Delta A/A$ can be related to m by the relation $\Delta A/A=2m$ the above equation yields F'

$$F' = 4m\, k_1/Q_1$$

Figure 12:
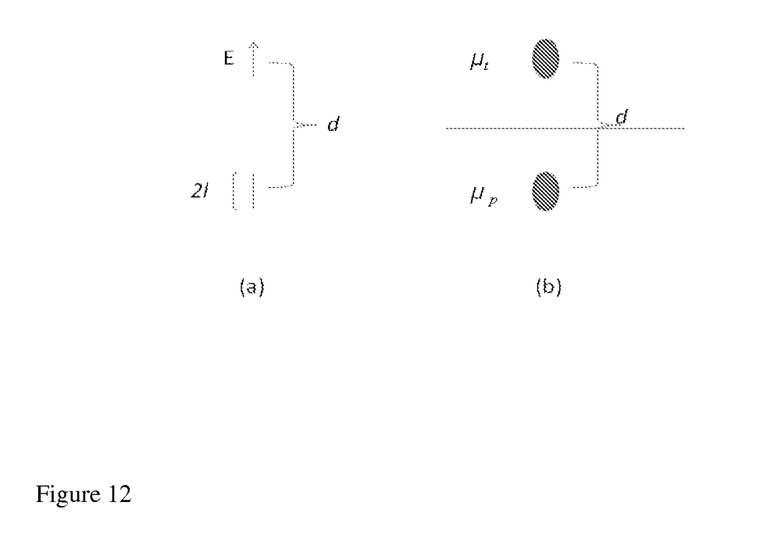
FIG. 12 shows (a) Dipole and its field at distance d; (b) Dipole of the particle $\mu_p$ coupling with a tip dipole $\mu_t$.

Substituting $m=2\times10^{-4}$, $Q_1=115$, and $k_1=3$ N/m, we get $F'=2.1\times10^{-5}$ N/m IV. Approximate Image Dipole Model and Comparison with Electrodynamic Simulation In this section we describe a simplified dipole theory to derive a closed form expression for the tip—particle force and force gradient. We can simplify the problem to a calculation of a particle dipole interacting with its mirror image on the tip as shown in FIG. 5(e) of the main text. Since the dimensions concerned are much less than the optical wavelength, the electrostatic approximation is valid provided we neglect retardation effects. Referring to FIG. 12, the z component of the electric field at a distance d from a dipole is given by $$E = \frac{1}{4\pi \varepsilon_0} \frac{2\mu d}{(d^2 - l^2)^3} \tag{1}$$

where 2 l is the dipole length. The induced dipole on the tip is given by $$\mu_t = 4\pi \varepsilon_0 \alpha_t (E+E_p) \tag{2}$$

where $E_p$ is the electric field at the tip due to the particle dipole. The induced dipole on the particle is given by $$\mu_p = 4\pi \varepsilon_0 \alpha_p (E+E_t) \tag{3}$$

Where $E_t$ is the electric field at the particle due to the tip dipole. We then solve equations (2) and (3) to obtain an expression for $E_p$ and then derive the force F on the tip from $$F = (\mu_t, \nabla)\mathcal{E} = \frac{8\pi s_0 \alpha_p \alpha_t E^2 (3d^2 + l^2)}{(d^2 - l^2)^3} \quad (4)$$

Where $\mathcal{E} = E + E_p$
And the force gradient F' from $$F' = \frac{\partial(\mu_t, \nabla)\varepsilon}{\partial d} = \frac{96\pi s_0 E^2 \alpha_p \alpha_t d(d^2 + l^2)}{(d^2 - l^2)^4} \quad (5)$$

In the limit of small l (<<d), the image force scales as $d^{-4}$ gradient of the image force scale as $d^{-5}$.

Figure 13:
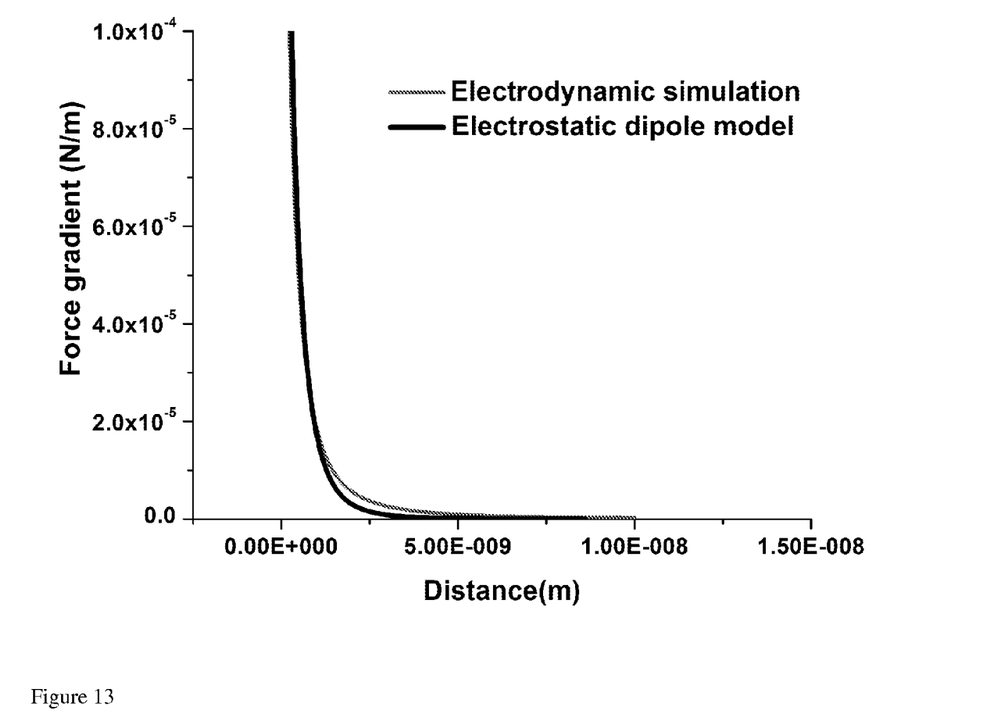
FIG. 13 shows comparison of calculated force gradient for tip-particle interaction compared with electrodynamic simulation.

FIG. 13 shows a comparison of the force gradient versus tip—particle spacing calculated using equation 5 compared with the electrodynamic simulation. In the calculated curve, we took l=0.5 nm and adjusted the scaling constant $E^2 \alpha_p \alpha_t$ to fit the simulated curve.

References (Which are Hereby Incorporated by Reference in their Entirety):
1. Frisbie, C. D., Rozsynai, L. F., Noy, A., Wrighton, M. S., Lieber, C. M., "Functional Group Imaging by Chemical Force Microscopy". *Science* 265, 2071-2074 (1994)
2. Martin, Y. & Wickramasinghe, H. K. Magnetic imaging by 'force microscopy' with 1000 Å resolution. *Appl. Phys. Lett.* 50, 1455-1457 (1987)
3. Rugar, D., Mamin, H. J., Guethner, P., Lambert, S. E., Stern, J. E., McFadyen, I. & Yogi, T. Magnetic force microscopy: General principles and application to longitudinal recording media *J. Appl. Phys.* 68, 1169-1183 (1990)
4. Martin, Y., Abraham, D. W., & Wickramasinghe, H. K. High—resolution capacitance measurement and potentiometry by force microscopy, *Appl. Phys. Lett.* 52, 1103-1105 (1988)
5. Normenmacher, M., O'Boyle, M. P. & Wickramasinghe, H. K. Kelvin probe force microscopy. *Appl. Phys. Lett.* 58: 2921-2923 (1991)
6. Rugar, D., Yannoni, C. S. & Sidles, J. A. Mechanical detection of magnetic resonance. *Nature* 360, 563-566 (1992)
7. Martin, Y., Williams, C. C., & Wickramasinghe, H. K. Atomic force microscope force mapping mapping and profiling on a sub 100-Å scale. *J. Appl. Phys.* 61, 4723-4729 (1987)
8. Ameri, S., Ash, E. A., Neuman, V. & Petts, C. R. Photo Displacement Imaging, *Elect. Lett.* 17, 337-338, (1981).
9. Black, E. D., Grudinin, I. S., Rao, S. R., & Libbrecht, K. G. Enhanced photothermal displacement spectroscopy for thin-film characterization using a Fabry-Perot resonator *J. Appl. Phys.* 95, 7655-7659 (2004)
10. Zenhausem, F., Martin, Y., & Wickramasinghe, H. K. Scanning Interferometric Apertureless Microscopy: Optical Imaging at 10 Angstrom Resolution, *Science* 269, 1083-1085 (1995).
11. Knoll, B. & Keilmann, F. Near-field probing of vibrational absorption for chemical microscopy, *Nature* 399, 134-137 (1999).
12. Palik, E. D. Handbook of Optical Constants of Solids (Academic, 1985)
13. Eagen, C. F. Applied Optics, Vol. 20 Issue 17, pp. 3035-3042 (1981).
14. Jackson, J. D. Classical Electrodynamics, 3rd Ed.", John Wiley & Sons, Inc., (1999).
15. Downes, A., Salter, D. & Elfick, A., *Optics Express*, 14, pp. 5216-5222 (2006).
16. Black, E. D., Grudinin, I. S., Rao, S. R. & Libbrecht, K. G., *J. Appl. Phys.*, 95, pp. 7655-7659 (2004).
17. Martin, Y., Williams, C. C. & Wickramasinghe, H. K., J. Appl. Phys., 61(10), pp 4723-4729 (1987).

The invention claimed is:

1. An atomic force microscope based apparatus comprising:
a probe tip for engaging a sample of interest, the probe tip being coupled to a structure that can oscillate the probe tip at a first frequency;
an electromagnetic source configured to emit electromagnetic radiation modulated at a second frequency onto the sample, wherein the second frequency of the modulated electromagnetic radiation is selected to measure an image force between the sample and the probe tip caused by molecular dipole/multipole generated in the sample by the modulated electromagnetic radiation and an image of the molecular dipole/multipole generated in the probe tip; and
a sensing electronics operably coupled to the structure to measure mechanical oscillations of the probe tip due to the image force between the sample and the probe tip caused by the molecular dipole/multipole generated in the sample and the image of the molecular dipole/multipole generated in the probe tip.

2. The apparatus of claim 1, wherein the first and second frequencies are selected so that their combined effect excites a mechanical resonance of the structure that oscillates the probe tip.

3. The apparatus of claim 2, wherein the first frequency coincides with the first mechanical resonance of the structure that oscillates the probe tip and the second frequency is selected so that a linear combination of the first and second frequencies coincides with the second mechanical resonance of the structure that oscillates the probe tip.

4. The apparatus of claim 2, wherein the sensor electronics includes a photodetector to measure the mechanical oscillations of the probe tip.

5. The apparatus of claim 4, wherein the sensor electronics further includes a phase sensitive detector connected to the photodetector, the phase sensitive detector being configured to detect signals that relate to the mechanical oscillations of the probe tip due to the image force between the sample and the probe tip caused by the molecular dipole/multipole generated in the sample and the image of the molecular dipole/multipole generated in the probe tip.

6. The microscope of claim 1, wherein the electromagnetic source is at least one of a fixed wavelength laser, a tunable laser, a magnetic emitter, and an electromagnetic emitter.

7. A method for nanoscale spectroscopic detection of a sample of interest, the method comprising:
positioning a probe tip over the sample, the probe tip being coupled to a structure;
driving the structure to oscillate the probe tip at a first frequency;
illuminating the sample using electromagnetic radiation that is modulated at a second frequency, wherein the second frequency of the modulated electromagnetic radiation is selected to measure an image force between the sample and the probe tip caused by molecular dipole/multipole generated in the sample by the modulated electromagnetic radiation and an image of the molecular dipole/multipole generated in the probe tip; and
measuring mechanical oscillations of the probe tip due to the image force between the sample and the probe tip caused by molecular dipole/multipole generated in the sample and the image of the molecular dipole/multipole generated in the probe tip.

8. The method of claim 7, wherein the first and second frequencies are selected so that their combined effect excites a mechanical resonance of the structure that oscillates the probe tip.

9. The method of claim 8, wherein the first frequency coincides with the first mechanical resonance of the structure that oscillates the probe tip and the second frequency is selected so that a linear combination of the first and second frequencies coincides with the second mechanical resonance of the structure that oscillates the probe tip.

10. The method of claim 8, wherein the measuring includes detecting light reflected from the structure using a photodetector to measure the mechanical oscillations of the probe tip.

11. The method of claim 10, wherein the measuring includes detecting signals from the photodetector using a phase sensitive detector that relate to the mechanical oscillations of the probe tip due to the image force between the sample and the probe tip caused by the molecular dipole/multipole generated in the sample and the image of the molecular dipole/multipole generated in the probe tip.

12. The method of claim 7, wherein the modulated electromagnetic radiation is generated using at least one of a fixed wavelength laser, a tunable laser, a magnetic emitter, and an electromagnetic emitter.

* * * * *